US 9,856,937 B2

(12) United States Patent
Subotic et al.

(10) Patent No.: US 9,856,937 B2
(45) Date of Patent: Jan. 2, 2018

(54) COINED FRICTION MATERIAL FOR MOTOR VEHICLE DRIVE TRAIN

(71) Applicant: Schaeffler Technologies AG & Co. KG, Herzogenaurach (DE)

(72) Inventors: Jasmina Subotic, Wooster, OH (US); Brian Stoller, Marshallville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/723,204

(22) Filed: May 27, 2015

(65) Prior Publication Data

US 2016/0348736 A1 Dec. 1, 2016

(51) Int. Cl.
| | |
|---|---|
| *F16D 13/64* | (2006.01) |
| *F16D 13/66* | (2006.01) |
| *F16D 69/00* | (2006.01) |
| *F16H 45/02* | (2006.01) |

(52) U.S. Cl.
CPC ............ *F16D 69/00* (2013.01); *F16D 13/64* (2013.01); *F16D 13/66* (2013.01); *F16D 2069/004* (2013.01); *F16D 2200/0065* (2013.01); *F16D 2250/0023* (2013.01); *F16D 2250/0069* (2013.01); *F16H 2045/0289* (2013.01)

(58) Field of Classification Search
CPC .......... F16D 13/60; F16D 13/64; F16D 69/00; F16D 2069/004; F16D 2250/0023; F16D 13/66; F16H 41/24; F16H 45/02; F16H 2045/0289
See application file for complete search history.

(56) References Cited

U.S. PATENT DOCUMENTS

| | | | | |
|---|---|---|---|---|
| 4,045,608 A | * | 8/1977 | Todd | F16D 69/021 |
| | | | | 156/278 |
| 4,950,530 A | * | 8/1990 | Shibatani | D03D 15/00 |
| | | | | 192/107 M |
| 5,975,260 A | * | 11/1999 | Fischer | F16H 45/02 |
| | | | | 192/107 R |
| 2004/0074733 A1 | * | 4/2004 | Suzuki | F16D 69/00 |
| | | | | 192/107 R |
| 2007/0108007 A1 | * | 5/2007 | Matsumoto | F16H 45/02 |
| | | | | 192/3.29 |
| 2008/0199641 A1 | * | 8/2008 | Hasegawa | F16D 13/64 |
| | | | | 428/34.1 |

FOREIGN PATENT DOCUMENTS

GB 1264543 A * 2/1972 ............ F16D 65/02

* cited by examiner

*Primary Examiner* — Richard Lorence
(74) *Attorney, Agent, or Firm* — Davidson, Davidson & Kappel, LLC

(57) ABSTRACT

A friction material for a motor vehicle drive train component is provided. The friction material includes an outer circumference, an inner circumference, an engagement surface configured for engaging with and disengaging from a mating component and a coined section extending between at least one of the outer circumference and the engagement surface and the inner circumference and the engagement surface. A method of forming a friction material for a motor vehicle drive train component is also provided. The method includes attaching a first axial surface of the friction material to a support and coining at least one of an inner circumference and an outer circumference at a second axial surface of a friction material to form a coined section. The second axial surface is on an opposite side as the first axial surface.

20 Claims, 4 Drawing Sheets

COINED FRICTION MATERIAL FOR MOTOR VEHICLE DRIVE TRAIN

The present disclosure relates generally to motor vehicle drive train clutches and more specifically to friction rings for motor vehicle drive train clutches.

BACKGROUND

Cone clutches and flat clutches are used in motor vehicle drive trains.

SUMMARY OF THE INVENTION

An object of the present disclosure is to provide clutches in which an imperfect match between angles on the clutch and a mating surface does not result in premature contact points at the inner diameter or outer diameter of friction material that cause tearing of the friction material.

A friction material for a motor vehicle drive train component is provided. The friction material includes an outer circumference, an inner circumference, an engagement surface configured for engaging with and disengaging from a mating component and a coined section extending between at least one of the outer circumference and the engagement surface and the inner circumference and the engagement surface.

A torque converter component is also provided. The torque converter component includes a support and the friction material fixed to the support such that the engagement surface faces away from the support.

A torque converter is also provided. The torque converter includes the torque converter component and a mating element for engaging the torque converter component. The mating element engages the engagement surface of the friction material during engagement between the mating element and the torque converter component.

A method of forming a friction material for a motor vehicle drive train component is also provided. The method includes attaching a first axial surface of the friction material to a support and coining at least one of an inner circumference and an outer circumference at a second axial surface of a friction material to form a coined section. The second axial surface is on an opposite side as the first axial surface.

BRIEF DESCRIPTION OF THE DRAWINGS

The present invention is described below by reference to the following drawings, in which.

DETAILED DESCRIPTION

The disclosure provides friction rings in which concentricity of the friction material is maintained in flat and cone clutches. To improve concentricity after bonding, concentric rings may be coined at an outer diameter (OD) and/or inner diameter (ID) of the friction ring. Concentricity of the coined rings to a part centerline can be better controlled compared to the bonded rings.

Figure 1:
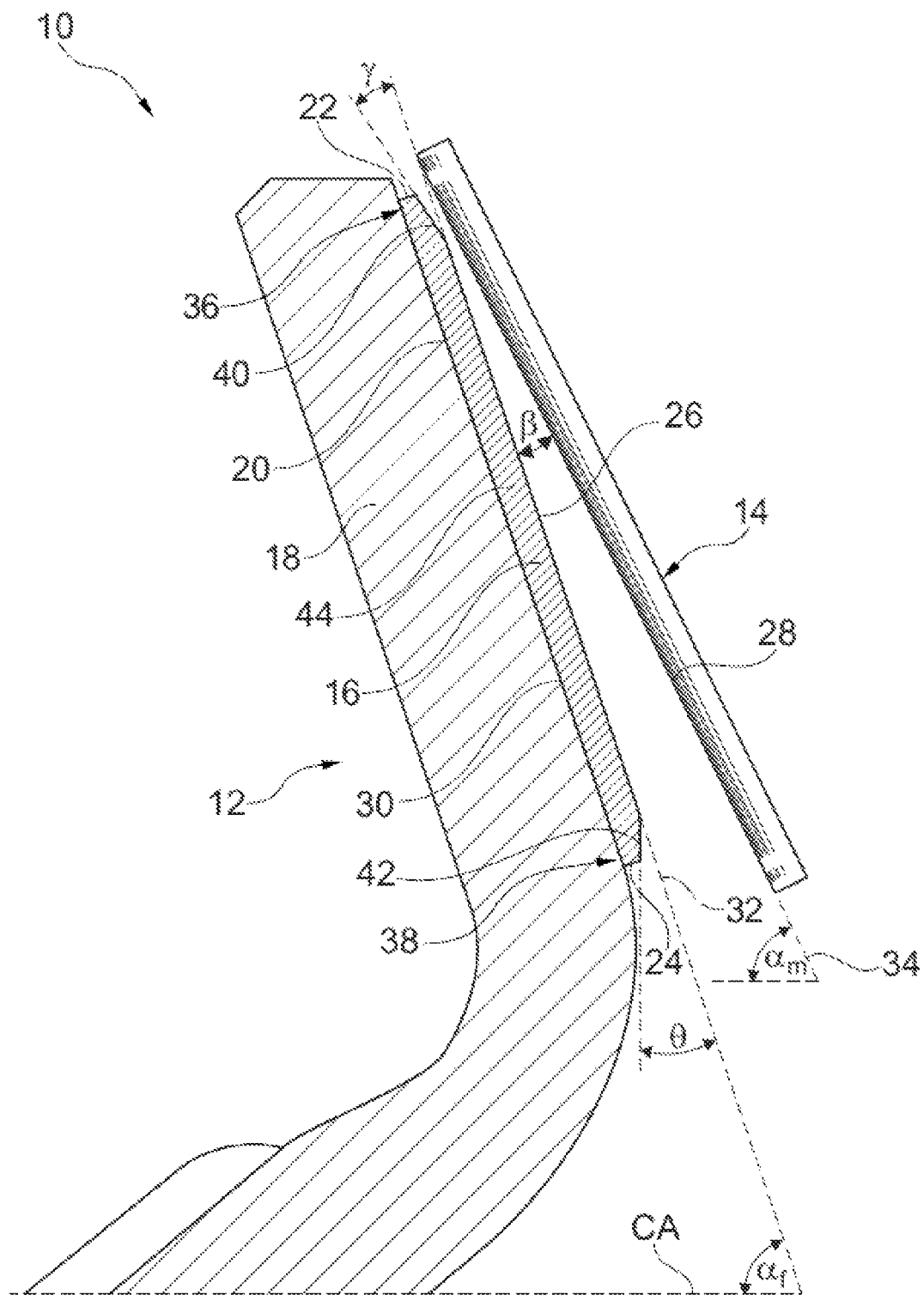
FIG. 1 shows a cross-sectional side view of a portion of a cone clutch in accordance with an embodiment of the present invention.

FIG. 1 shows a cross-sectional side view of a portion of a cone clutch 10 in accordance with an embodiment of the present invention. Cone clutch 10 includes a torque converter component 12, which in this exemplary embodiment is a clutch plate, and a mating component 14, which engage each other to transfer torque therebetween when desired and disengage from each other when transferring torque therebetween is not desired. In other embodiments, torque converter component 12 may be formed by an inner surface of a torque converter front cover, an inner surface of a torque converter impeller, a torque converter piston, or a torque converter turbine. Clutch plate 12 includes a friction material 16 that forms a ring extending annularly about a schematically shown center axis CA (actual position of which would be further radially offset from friction material 16) and a support 18 supporting friction material 16. In one preferred embodiment, friction material 16 is formed of a fibered textile composite friction lining and is adhesively bonded to a frustoconical and axially facing support surface 20 of support 18.

Friction material 16 includes an outer circumference 22, an inner circumference 24, an engagement surface 26 configured for engaging with and disengaging from a mating surface 28 of mating component 14 and a bonding surface 30 connected to support surface 20. Engagement surface 26 extends along a contact line 32, which forms an acute angle $\alpha_f$ with center axis CA. During an ideal operation of clutch 10, engagement surface 26 would be completely concentric with center axis CA and contact line 32 of engagement surface 26 would be arranged parallel to an engagement line 34 of mating surface 28 such that an entirety of engagement surface 26 contacts mating surface 28 at the same time. However, conventionally, during operation of clutch 10, allowed manufacturing tolerances of clutch plate 12 may be such that engagement surface 26 is not concentric to center axis CA and the pressure in the torque converter may cause ballooning or component deflection such that contact line 32 of engagement surface 26 is arranged at an angle β with respect to engagement line 34 of mating surface 28. In the case where acute angle $\alpha_f$ of contact line 32 with respect to center axis CA is greater than an acute angle $\alpha_m$ of engagement line 34 with respect to center axis CA, the eccentricity of the outer circumference with respect to center axis CA may cause a point on the outer circumference of the friction material—i.e., a point of the outer circumference that is furthest away from center axis CA—to contact mating surface 28 before the remainder of the engagement surface 26, which may lead to a tearing of the friction material. In the case where acute angle $\alpha_f$ of contact line 32 with respect to center axis CA is less than an acute angle $\alpha_m$ of engagement line 34 with respect to center axis CA, the eccentricity of the inner circumference with respect to center axis CA may cause a point on the inner circumference of the friction material—i.e., a point of the inner circumference that is closest to center axis CA—to contact mating surface 28 before the remainder of the engagement surface 26, which may lead to a tearing of the friction material.

In the embodiment shown in FIG. 1, friction material 16 includes an outer coined section 36 extending between outer circumference 22 and engagement surface 26 and an inner coined section 38 extending between inner circumference 24 and engagement surface 26 for minimizing the effects of manufacturing tolerances. In this embodiment, both outer coined section 36 and inner coined section 38 are ring shaped when viewed in the axial direction. Outer coined section 36 includes a tapered surface 40 that is frustoconical in shape and is tapered at an angle γ with respect to contact line 32 of engagement surface 26; and inner coined section 38 includes a tapered surface 42 that is frustoconical in shape and is tapered at angle θ with respect to contact line 32 of engagement surface 26. In a preferred embodiment, angle γ and angle θ are greater than the highest expected angle β between contact line 32 and engagement line 34. Outer coined section 36 decreases in thickness between a body portion 44 of friction material 16, which is formed between engagement surface 26 and bonding surface 30, and outer circumference 22 such that tapered surface 40 extends axially away from contact line 32 and an axial thickness of friction material 16 at outer circumference 22 is less than at body portion 44. Because of the force of the coining, which is described in further detail below, outer coined section 36 between tapered surface 40 and bonding surface 30 is more compressed than body portion 44. Similarly, inner coined section 38 decreases in thickness between body portion 44 of friction material 16 and inner circumference 24 such that tapered surface 42 extends axially away from contact line 32 and an axial thickness of friction material 16 at outer circumference 22 is less than at body portion 44. Because of the force of the coining, inner coined section 38 between tapered surface 42 and bonding surface 30 is also more compressed than body portion 44. Coined section 36, 38 are thus formed to provide an engagement surface 26 that is concentric with center axis CA, or at least is more concentric than before the coining.

Figure 2:
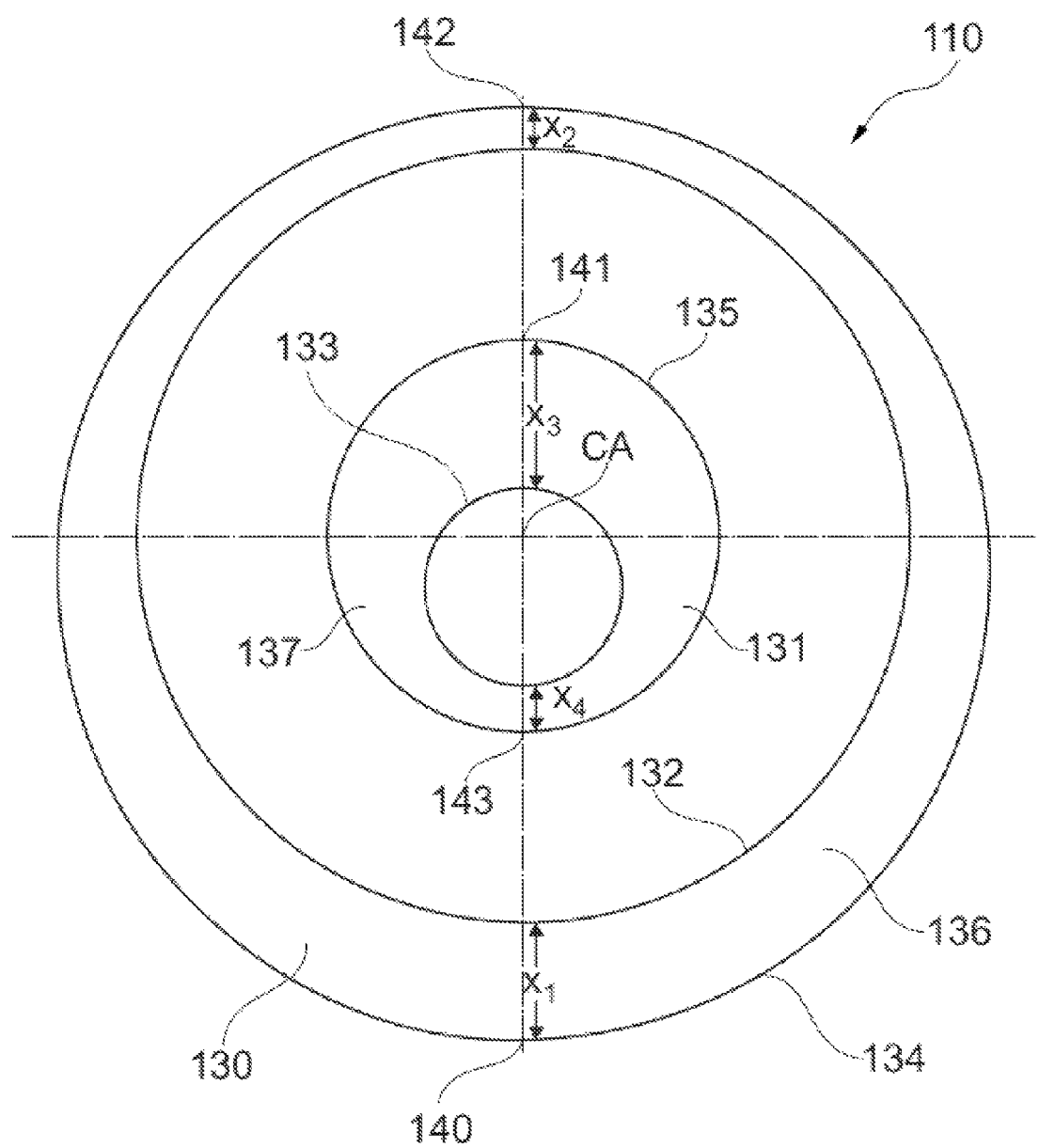
FIG. 2 schematically shows an axial plan view of an exemplary shape of a coined section of a cone clutch according to an embodiment of the present invention.

FIG. 2 schematically shows an axial plan view of an exemplary shape of a surface of a coined friction material 110 for a cone clutch according to an embodiment of the present invention. In this example, frictional material 110 includes an outer coined section 130 and an inner coined section 131. As shown, coined section 130 is eccentrically shaped and has a varying radial length between an inner circumferential edge 132 and an outer circumferential edge 134 such that a tapered surface 136, which has a frustoconical shape, extending between edges 132, 134 varies in length. In other words, coined section 130 has an annular shape and includes a first end 140 having a first radial length X1 opposite a second end 142 having a second radial length X2, with first radial length X1 being greater than second radial length X2, and tapered surface 136 gradually increases in radial length as coined section 130 extends from second end 142 to first end 140. The eccentricity of coined section 130 results from the friction material ring—as shown by outer circumferential edge 134—being eccentrically positioned with respect to center axis CA before the coining. In order for the friction material ring to be positioned concentrically with respect to center axis CA—as shown by inner circumferential edge 132—coined section 130 is eccentrically shaped.

Similarly, as shown in FIG. 2 coined section 131 is eccentrically shaped and has a varying radial length between an inner circumferential edge 133 and an outer circumferential edge 135 such that a tapered surface 137, which has a frustoconical shape, extending between edges 133, 135 varies in length. In other words, coined section 131 has an annular shape and includes a first end 141 having a radial length X3 opposite a second end 143 having a radial length X4, with radial length X3 being greater than radial length X4, and tapered surface 137 gradually increases in radial length as coined section 131 extends from second end 143 to first end 141. The eccentricity of coined section 131 results from the friction material ring—as shown by inner circumferential edge 133—being eccentrically positioned with respect to center axis CA before the coining. In order for the friction material ring to be positioned concentrically with respect to center axis CA—as shown by outer circumferential edge 135—coined section 131 is eccentrically shaped.

Figure 3:
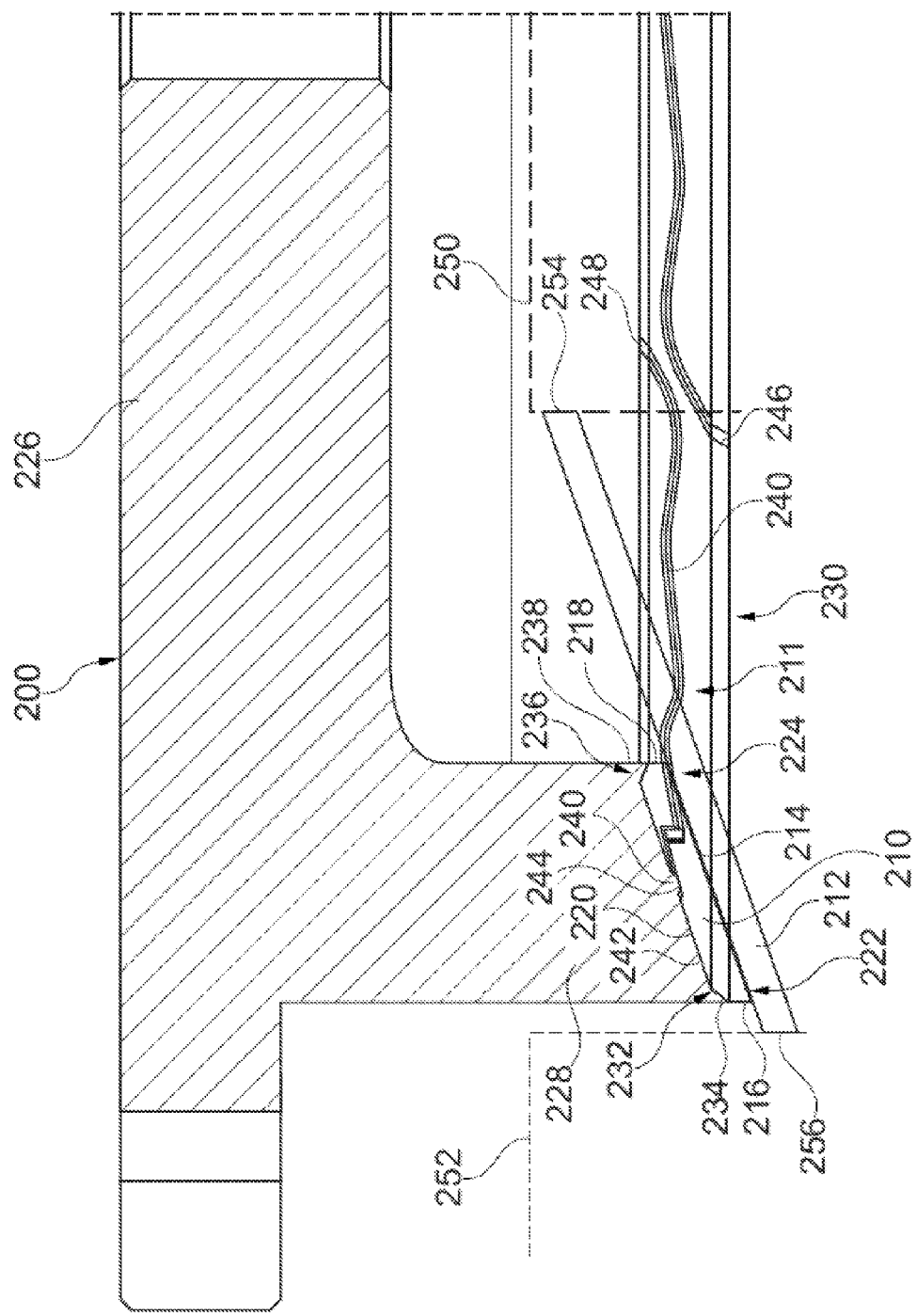
FIG. 3 shows a half cross-sectional side view of a die forming a coined frictional material ring of a torque converter component in accordance with an embodiment of the present invention.

FIG. 3 shows a half cross-sectional side view of a die 200 forming a coined frictional material ring 210 of a torque converter component 211, which is in the embodiment is a clutch plate, in accordance with an embodiment of the present invention. In other embodiments, torque converter component 211 may be formed by an inner surface of a torque converter front cover, an inner surface of a torque converter impeller, a torque converter piston, or a torque converter turbine. Friction material ring 210 is already bonded to a support 212 of clutch plate 211 at a first axial surface 214 of friction material ring 210. Die 200 is used for coining both an outer circumference 216 and an inner circumference 218 at a second axial surface 220 of a friction material ring 210 to form an outer coined section 222 and an inner coined section 224, respectively. Die 200 includes a base 226 and a ring section 228 extending axially from base 226. At a conical surface 230 of ring section 228, die 200 includes an outer coining section 232 having a tapered shape adjoining an outer circumference 234 thereof and an inner coining section 236 having a tapered shape adjoining an inner circumference 238. The coining of friction material ring 210 includes pressing conical surface 230 of ring section 228 against second axial surface 220 such that outer coining section 232 compresses friction material ring 210 to achieve certain paper body thickness and to form outer coined section 222 on friction ring 210 and inner coining section 236 compresses friction material ring 210 to form inner coined section 224 on friction ring 210. In other words, a surface of die 200 extending between coining sections 232, 236 compresses friction material ring 210 and the coining of friction material ring 210 is performed by coining section 232, 236.

Die 200 also includes embossments 240 at conical surface 230 that extend from inner circumference 238 to outer circumference 234 of die 200 through both of coining sections 232, 236 and through a frustoconical base surface 242 formed radially between coining sections 232, 236. During the coining, embossments 240 contact second axial surface 220 to form corresponding grooves 244 in friction material ring 210. Grooves 244 extend from outer circumference 216 to inner circumference 218 through coined sections 222, 224 and thus include an outer groove section 246 and an inner groove section 248 to allow for fluid to flow radially through friction material ring 210. Before the coining, clutch plate 211 is centered with respect to die 200 by a radially expandable centering feature, which is formed by either a schematically shown radially inner section 250 or a schematically shown radially outer section 252. To accurately center clutch plate 211, inner section 250 is radially expandable to contact an inner circumference 254 of support 212 and outer section 252 is radially expandable to contact an outer circumference 256 of support 212.

Figures 4A, 4B:
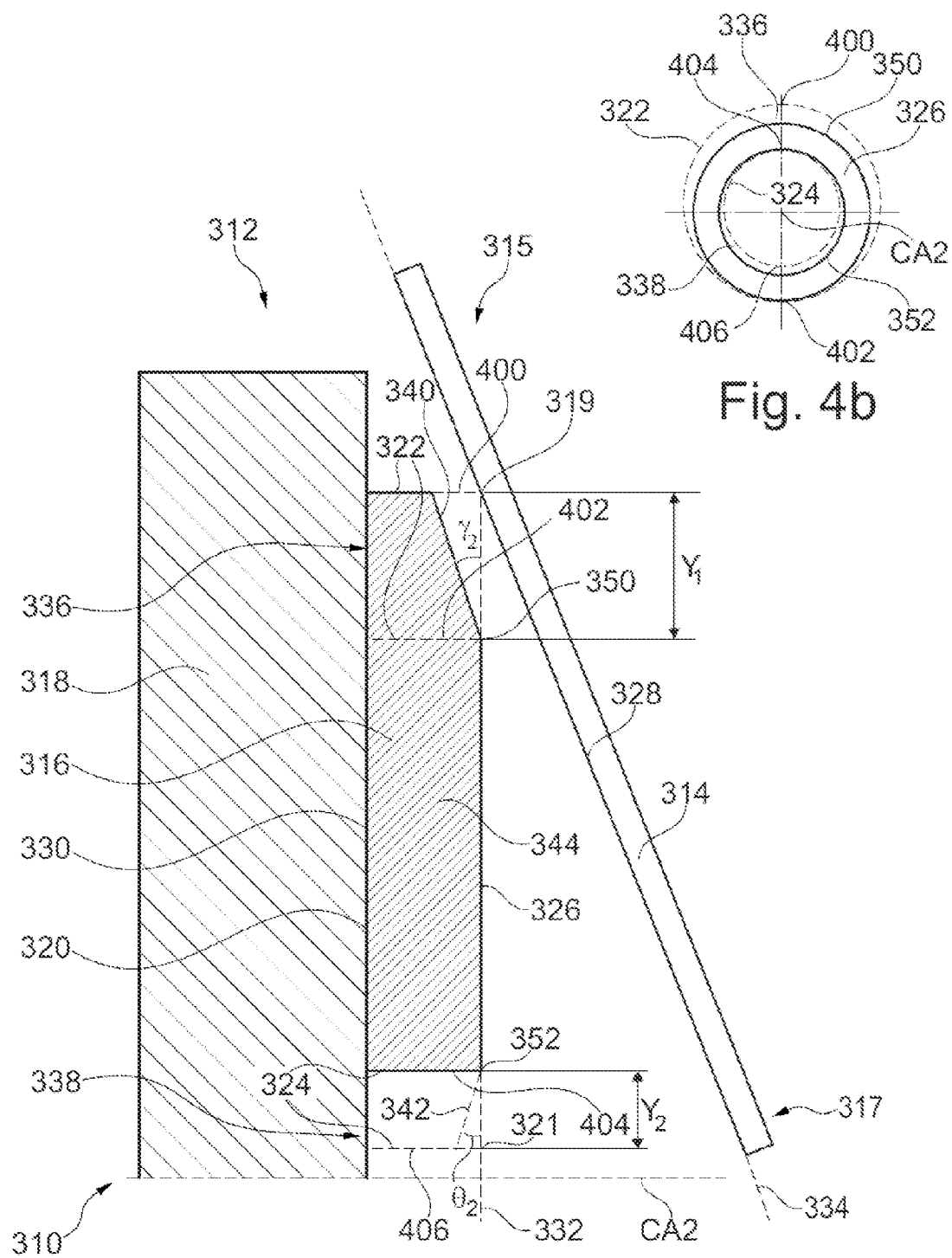
FIG. 4a shows a cross-sectional side view of a portion of a flat clutch in accordance with an embodiment of the present invention.
FIG. 4b schematically shows a view of a friction material from the flat clutch in FIG. 4a along a contact plane thereof.

FIG. 4a shows a cross-sectional side view of a portion of a flat clutch 310 in accordance with an embodiment of the present invention. Flat clutch 310 includes a torque converter component 312, which is in the embodiment is a clutch plate, and a mating component 314, which engage each other to transfer torque therebetween when desired and disengage each other when transferring torque therebetween is not desired. In other embodiments, torque converter component 312 may be formed by an inner surface of a torque converter front cover, an inner surface of a torque converter impeller, a torque converter piston, or a torque converter turbine. Clutch plate 312 includes a friction material 316 that forms a ring extending annularly about center axis CA2 (actual position of which would be further radially offset from friction material 316) and a support 318 supporting friction material 316. In one preferred embodiment, friction material 316 is formed of a fibered textile composite friction lining and is adhesively bonded to a flat and axially facing support surface 320 of support 318.

Friction material 316 includes an outer circumference 322, an inner circumference 324, an engagement surface 326 configured for engaging with and disengaging from a mating surface 328 of mating component 314 and a bonding surface 330 connected to support surface 320. Engagement surface 326 extends along a contact line 332, which is perpendicular with center axis CA2. During an ideal operation of clutch 310, engagement surface 326 would be completely concentric with center axis CA2 and an engagement line 334 of mating surface 328 would be perpendicular with center axis CA2. However, conventionally, during operation of clutch 310, allowed manufacturing tolerances of clutch plate 312 may be such that engagement surface 326 is not concentric to center axis CA2 and the pressure in the torque converter may cause ballooning or component deflection such that contact line 332 of engagement surface 326 is arranged at a non-perpendicular angle with center axis CA2. A dashed line 400 schematically illustrates the location of an outermost section of the outer circumference with respect to CA2—i.e., a section that is furthest from center axis CA2—and a line 402 schematically illustrates the location of an innermost section of the outer circumference with respect to CA2—i.e., a section that is closest center axis CA2. Outermost section 400 is a distance Y1 further from center axis CA2 than innermost section 402. Similarly, a dashed line 406 schematically illustrates the location of an innermost section of the inner circumference with respect to CA2—i.e., a section that is closest to center axis CA2—and a line 404 schematically illustrates the location of an outermost section of the inner circumference with respect to CA2—i.e., a section that is furthest from center axis CA2. Outermost section 404 is a distance Y2 further from center axis CA2 than innermost section 406. It should be noted that the innermost and outermost sections of the outer circumferences are on opposite sides of center axis CA2 and the innermost and outermost sections of the inner circumferences are on opposite sides of center axis CA2, but because the view in FIG. 4a only illustrates a portion of clutch 310 along the line of outermost section 400 and outermost section 404, the innermost and outermost sections of the outer circumferences are shown on the same side of center axis CA2 and the innermost and outermost sections of the inner circumferences are shown on the same side of center axis CA2. FIG. 4b schematically shows a view of friction material 316 along contact line 332 and illustrates exemplary positions of sections 400, 402, 404, 406 when view axially.

In the case where mating component 314 is angled such that an outer radial end 315 of mating component 314 is closer to engagement surface 326 than an inner radial end 317 of mating component 314, the eccentricity of the outer circumference of conventional friction material (i.e., before coining) with respect to center axis CA may cause a point 319 on the outer circumference of the friction material—i.e., a point of the outer circumference that is furthest away from center axis CA—to contact mating surface 328 before the remainder of the engagement surface 326, which may lead to a tearing of the friction material. In the case where mating component 314 is angled such that inner radial end 317 of mating component 314 is closer to engagement surface 326 than outer radial end 315 of mating component 314, the eccentricity of the inner circumference of conventional friction material (i.e., before coining) with respect to center axis CA may cause a point 321 on the inner circumference of the friction material—i.e., a point of the inner circumference that is furthest away from center axis CA—to contact mating surface 328 before the remainder of the engagement surface 326, which may lead to a tearing of the friction material.

In the embodiment shown in FIGS. 4a and 4b, friction material 316 includes an outer coined section 336 extending between outer circumference 322 and engagement surface 326 and an inner coined section 338 (shown by dashed lines in FIG. 4a) extending between inner circumference 324 and engagement surface 326 for minimizing the effects of manufacturing tolerances. In this embodiment, both outer coined section 336 and inner coined section 338 are ring shaped when viewed in the axial direction. Outer coined section 336 includes a tapered surface 340 that frustoconical in shape and is tapered at an angle γ2 with respect to contact line 332 of engagement surface 326; and inner coined section 338 includes a tapered surface 342 that is frustoconical in shape and is tapered at angle θ2 with respect to contact line 332 of engagement surface 326. Outer coined section 336 decreases in thickness between a body portion 344 of friction material 316, which is formed between engagement surface 326 and bonding surface 330, and outer circumference 322 such that tapered surface 340 extends axially away from contact line 332 and an axial thickness of friction material 316 at outer circumference 322 is less than at body portion 344. Because of the force of the paper compressing and coining, which is similar to that described above with respect to FIG. 3 with the exception of the flat versus frustoconical shape of the engagement surface, outer coined section 336 between tapered surface 340 and bonding surface 330 is more compressed than body portion 344. Similarly, inner coined section 338 decreases in thickness between body portion 344 of friction material 316 and inner circumference 324 such that tapered surface 342 extends axially away from contact line 332 and an axial thickness of friction material 316 at outer circumference 322 is less than at body portion 344. Because of the force of the coining, inner coined section 338 between tapered surface 342 and bonding surface 330 is also more compressed than body portion 344.

In the embodiment shown in FIGS. 4a and 4b, an inner circumferential edge 350 of outer coined section 336 is concentric with center axis CA2 and is located at the same radial distance from center axis CA2 as innermost section 402 and outer circumferential edge 352 of inner coined section 338 is concentric with center axis CA2 and is located as the same radial distance from center axis CA2 as outermost section 404 (see the graphic in the upper right hand corner of FIG. 4). Coined sections 336, 338 are thus formed to provide an engagement surface 326 that is concentric with center axis CA2. In other embodiments, similar to the example shown in FIG. 2, coined section 336 may be formed such that inner circumferential edge 350 of outer coined section 336 is located at a radial distance from center axis CA2 that is less than the radial distance innermost section 402 is from center axis CA2 and coined section 338 may be formed such that outer circumferential edge 352 of inner coined section 338 is located at a radial distance from center axis CA2 that is greater than the radial distance outermost section 404 is from center axis CA2.

In the preceding specification, the invention has been described with reference to specific exemplary embodiments and examples thereof. It will, however, be evident that various modifications and changes may be made thereto, including combination of the various embodiments, without departing from the broader spirit and scope of invention as set forth in the claims that follow. The specification and drawings are accordingly to be regarded in an illustrative manner rather than a restrictive sense.

What is claimed is:

1. A friction material for a motor vehicle drive train clutch comprising:
    an outer circumference;
    an inner circumference;
    an engagement surface configured for engaging with and disengaging from a mating component; and
    a coined section extending between at least one of the outer circumference and the engagement surface and the inner circumference and the engagement surface, the coined section having a varying radial length.

2. The friction material as recited in claim 1 wherein the coined section is tapered at an angle with respect to the engagement surface.

3. The friction material as recited in claim 1 wherein the engagement surface is frustoconical in shape.

4. The friction material as recited in claim 1 wherein the engagement surface is a flat surface extending in a plane perpendicular to a center axis of the friction material.

5. The friction material as recited in claim 1 wherein the friction material is formed of a fibered textile composite friction lining.

6. The friction material as recited in claim 1 wherein the engagement surface includes grooves formed therein extending from the inner circumference to the outer circumference through the coined section.

7. The friction material as recited in claim 1 wherein the coined section has an annular shape and includes a first end having a first radial length opposite a second end having a second radial length, the first radial length being greater than the second radial length, the coined section gradually increasing in radial length as the coined section extends from the second end to the first end.

8. A torque converter component comprising:
    a support; and
    the friction material as recited in claim 1 fixed to the support such that the engagement surface faces away from the support.

9. A torque converter comprising:
    the torque converter component as recited in claim 8; and
    a mating element for engaging the torque converter component, the mating element engaging the engagement surface of the friction material during engagement between the mating element and the torque converter component.

10. The friction material as recited in claim 1 wherein the coined section is eccentrically shaped.

11. The friction material as recited in claim 10 wherein the coined section extends between the outer circumference and the engagement surface, the friction material further comprising a further eccentrically shaped coined section extending between the inner circumference and the engagement surface.

12. A method of forming a torque converter component comprising:
    attaching a first axial surface of a friction material to a support; and
    coining at least one of an inner circumference and an outer circumference at a second axial surface of the friction material to form a coined section, the second axial surface being on an opposite side as the first axial surface, the coined section having an annular shape of varying radial length.

13. The method as recited in claim 12 wherein the coining the friction material includes pressing a die against the second axial surface, the die including a coining section on at least one of an inner circumference or outer circumference thereof.

14. The method as recited in claim 13 wherein the die includes embossments extending from the inner and outer circumference of the die through the coining section, the coining including contacting the second axial surface with the embossments to form grooves in the second axial surface extending from the inner circumference to the outer circumference of the friction material through the coined section.

15. The method as recited in claim 12 wherein the second axial surface is a frustoconical surface extending between the inner circumference and the outer circumference.

16. The method as recited in claim 15 wherein the coined section extends at an angle with respect to the frustoconical axial surface.

17. The method as recited in claim 12 wherein the second axial surface is a flat surface extending in a plane perpendicular to the center axis.

18. The method as recited in claim 12 wherein the friction material is formed of a fibered textile composite friction lining.

19. The method as recited in claim 12 wherein the coining of the at least one of the inner circumference and the outer circumference includes coining both the inner circumference and the outer circumference to form an eccentrically shaped inner coined section and an eccentrically shaped outer coined section.

20. A method of forming a torque converter component comprising:
    attaching a first axial surface of a friction material to a support and arranging the support such that a second axial surface of the friction material is arranged eccentrically with respect to a center axis of the torque converter component, the second axial surface being on an opposite side as the first axial surface; and
    coining an inner circumference and an outer circumference at the second axial surface of the friction material to form an eccentrically shaped inner coined section and an eccentrically shaped outer coined section, the coining forming an engagement surface arranged concentrically with respect to the center axis.

* * * * *